United States Patent
Palazzolo et al.

[11] Patent Number: 6,164,716
[45] Date of Patent: Dec. 26, 2000

[54] ENERGY DISSIPATING BODY PANEL ASSEMBLY

[75] Inventors: Joseph A. Palazzolo, Northville; Anna Hui, Rochester Hills, both of Mich.

[73] Assignee: DaimlerChrysler Corporation, Auburn Hills, Mich.

[21] Appl. No.: 09/215,693

[22] Filed: Dec. 18, 1998

[51] Int. Cl.[7] ........................................................ B60J 5/00
[52] U.S. Cl. ........................................ 296/188; 296/146.6
[58] Field of Search ................................. 296/146.6, 188, 296/189, 191; 52/784.14, 793.1

[56] References Cited

U.S. PATENT DOCUMENTS

| | | |
|---|---|---|
| 3,791,693 | 2/1974 | Hellriegel et al. . |
| 3,829,149 | 8/1974 | Stevens . |
| 3,868,796 | 3/1975 | Bush . |
| 3,964,208 | 6/1976 | Renner et al. . |
| 4,786,100 | 11/1988 | Kleemann et al. . |
| 4,861,097 | 8/1989 | Wycech . |
| 4,901,500 | 2/1990 | Wycech . |
| 5,040,335 | 8/1991 | Grimes . |
| 5,306,066 | 4/1994 | Saathoff . |
| 5,306,068 | 4/1994 | Nakae et al. . |
| 5,395,135 | 3/1995 | Lim et al. . |
| 5,435,619 | 7/1995 | Nakae et al. . |
| 5,466,031 | 11/1995 | Uchida et al. . |
| 5,536,060 | 7/1996 | Rashid et al. ......................... 296/146.6 |
| 5,577,794 | 11/1996 | Gandhi et al. . |
| 5,580,119 | 12/1996 | Uchida et al. . |
| 5,595,415 | 1/1997 | Beaulat . |
| 5,707,098 | 1/1998 | Uchida et al. . |
| 5,749,600 | 5/1998 | Yamada et al. . |
| 5,924,760 | 7/1999 | Krajewski et al. ................... 296/146.6 |

*Primary Examiner*—D. Glenn Dayoan
*Assistant Examiner*—Patricia Engle
*Attorney, Agent, or Firm*—Roland A. Fuller, III

[57] ABSTRACT

A body panel assembly is provided for dissipating impact energy. The body panel assembly includes an inner member having a desired inner area. The inner area is defined by a perimeter which includes a top, bottom, and sides. The assembly has an outer member with a desired outer area, defined by a perimeter which includes a top, bottom, and sides. The inner and outer members are positioned with respect to one another to define a cavity. An intermediate member is positioned in the cavity between the inner and outer members. The intermediate member extends from the top to the bottom of the inner and outer members. In addition, a structural material is positioned in a space between the outer member and the intermediate member for dissipating impact energy. The structural material extends from the top to the bottom of the intermediate and outer members and is comprised of foam or a honeycomb plastic.

18 Claims, 6 Drawing Sheets

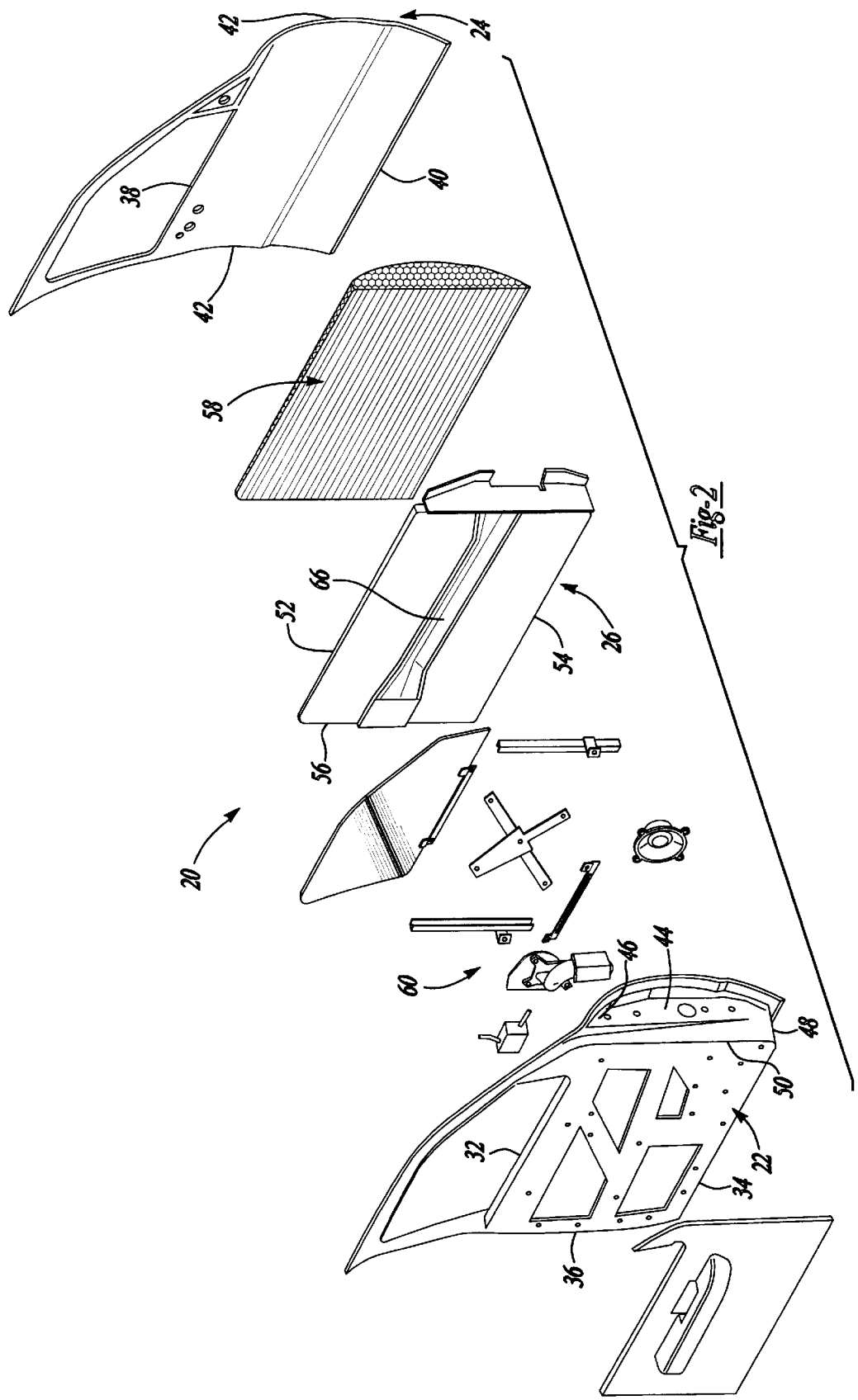

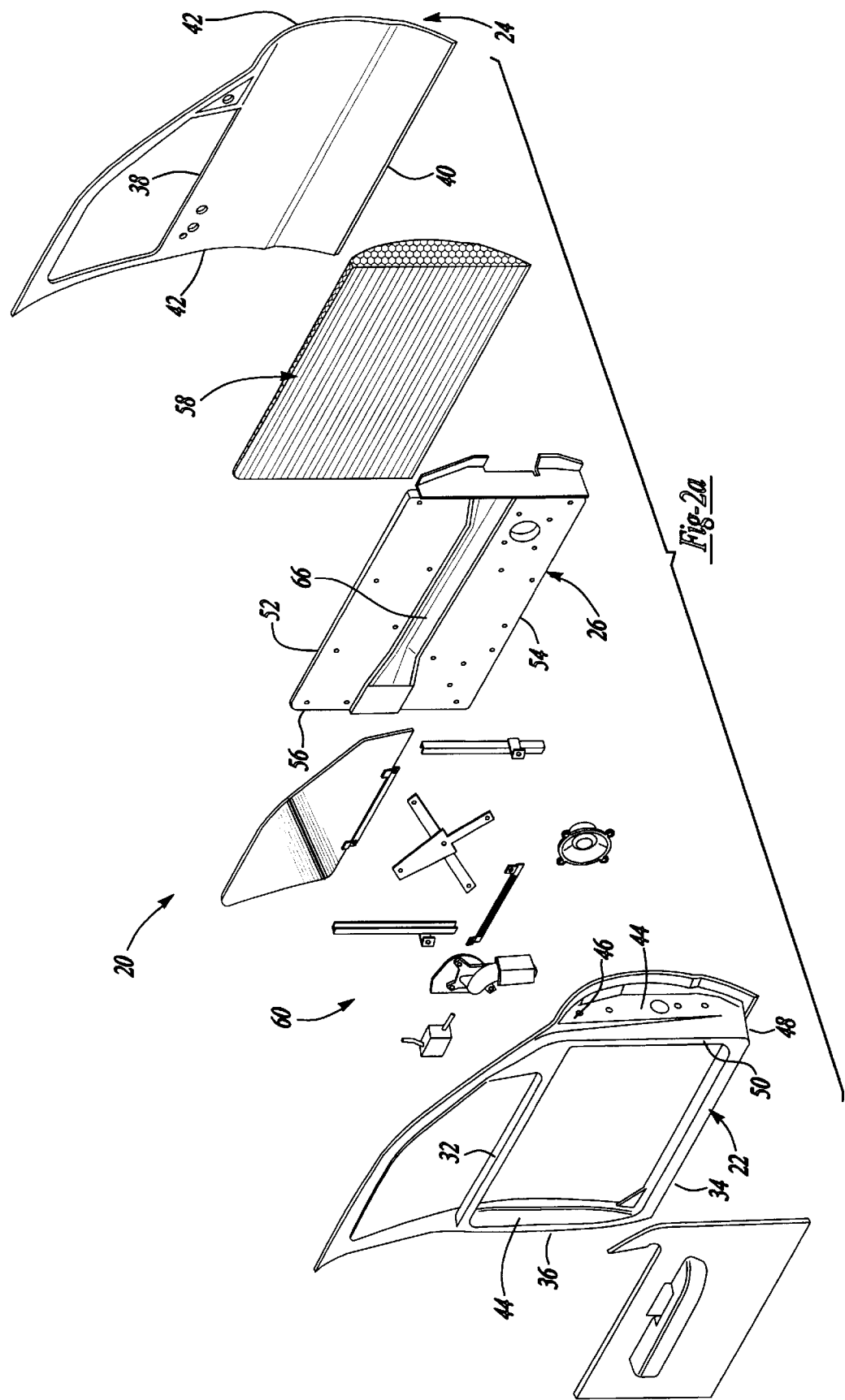

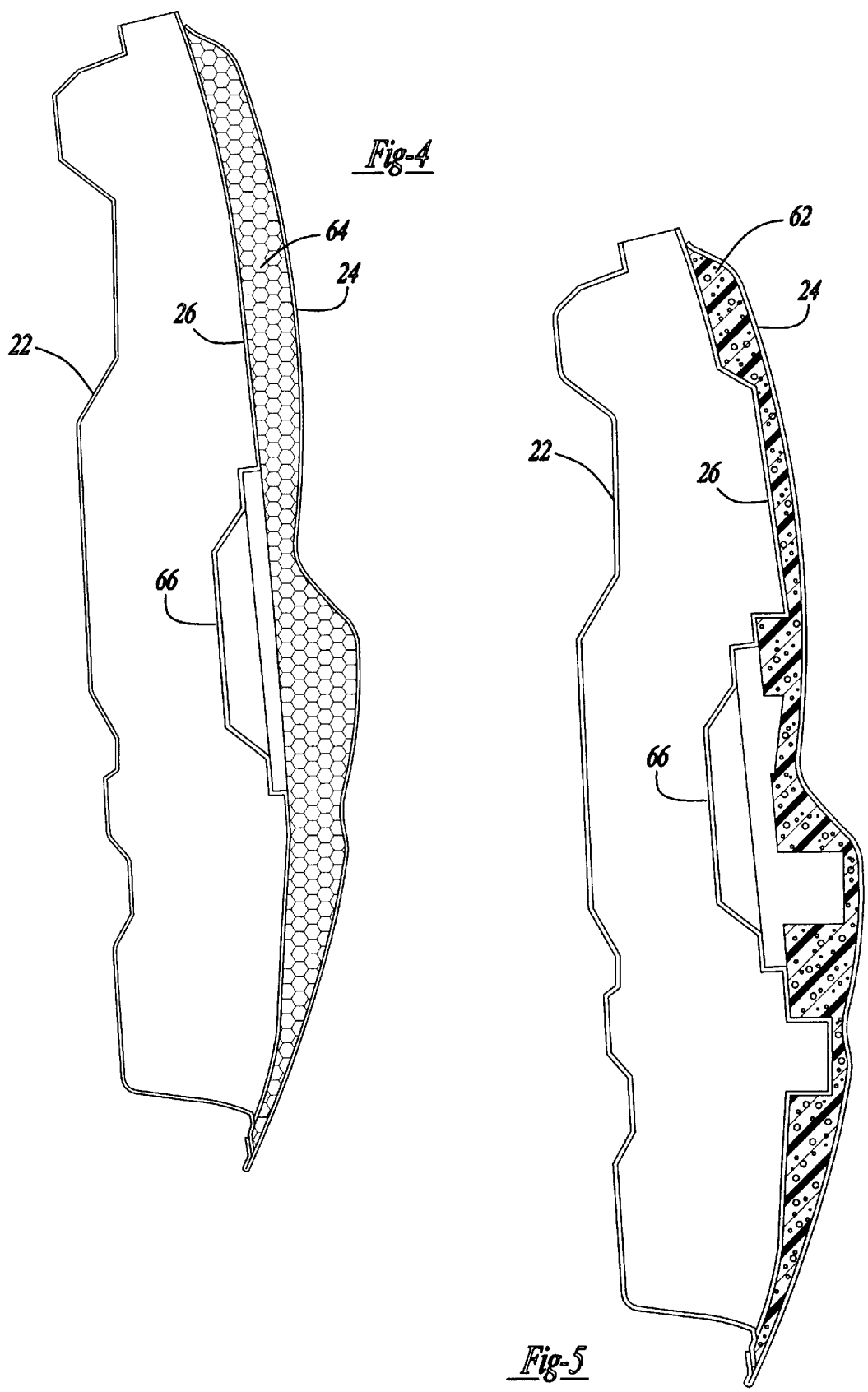

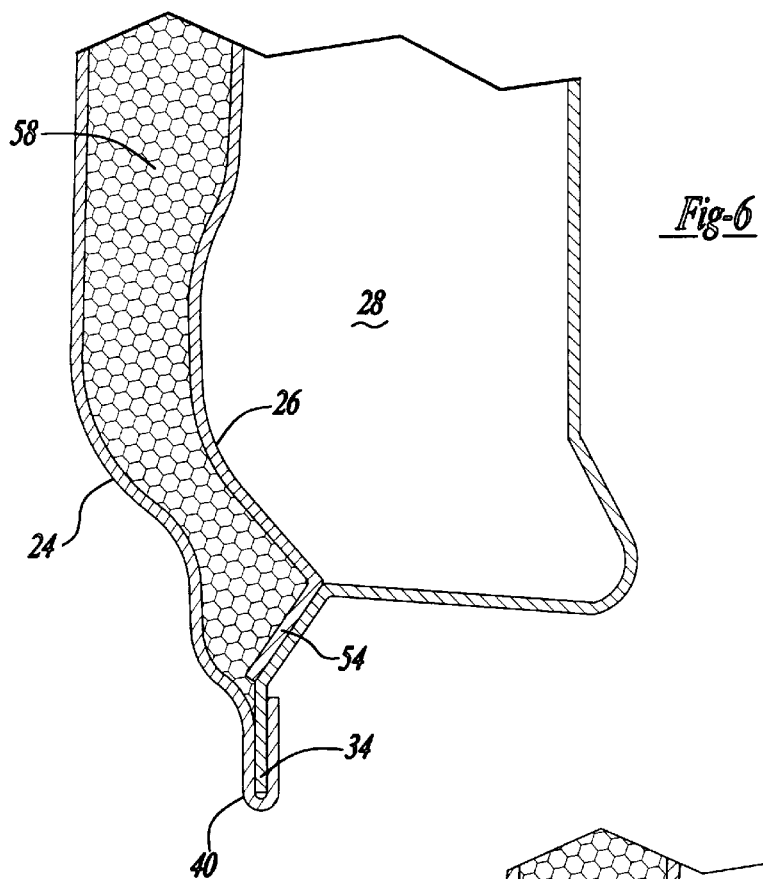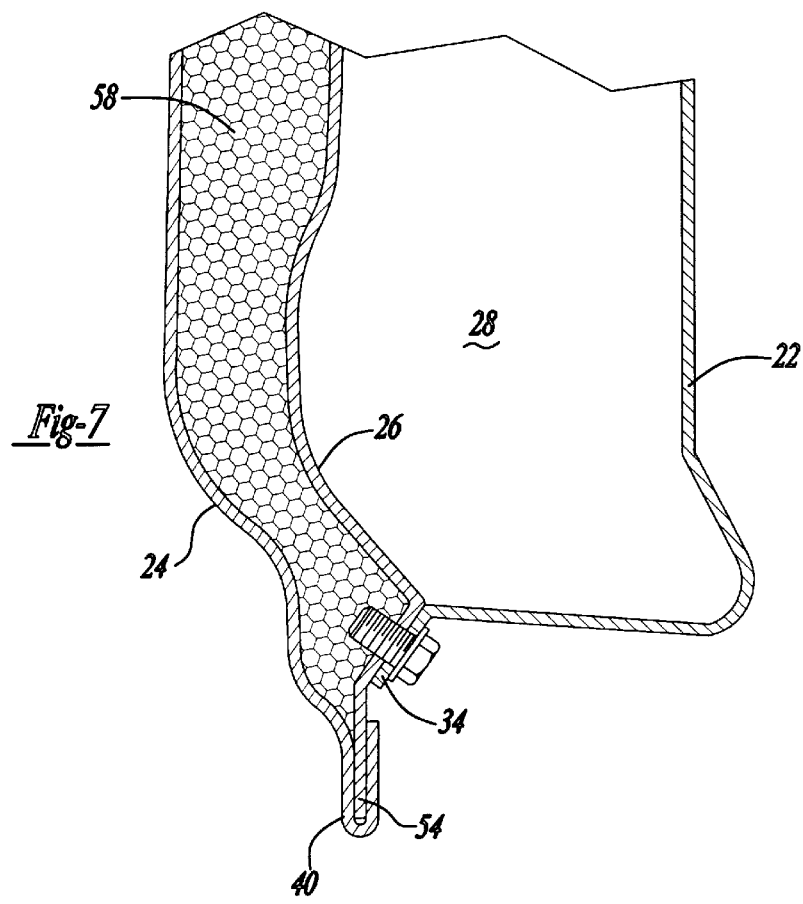

ENERGY DISSIPATING BODY PANEL ASSEMBLY

BACKGROUND OF THE INVENTION

1. Field of the Invention

The present invention relates generally to a body panel assembly for absorbing energy and, more particularly, to a vehicle door for dissipating impact energy exerted on a vehicle panel.

2. Discussion

It is well known that vehicles may collide with obstacles during operation. Vehicles have been designed to withstand energy on impact and to ensure the safety of passengers.

Manufactures have attempted to increase the safety of passengers during side impact by designing vehicle doors to absorb impact energy. Such attempts include vehicle doors with impact beams to reduce impact force. However, on impact, these beams often release from the door. These vehicle doors are heavy and expensive to manufacture. Also, the beams obstruct the space within the interior of the door dislocating mechanisms and wiring to be installed inside the door.

Further, vehicle doors have been constructed with padding along their inside panel. However, the padding is positioned only in select areas and only absorbs a limited amount of energy. The limited amount of padding has not increased passenger safety. Also, these doors with interior padding have diminished the amount of interior space available in the vehicle.

Therefore, it is desirable to provide a vehicle door designed to absorb impact energy during side impact. Further it is desirable to reduce the cost and the weight of the vehicle door. This is accomplished by removing impact beams positioned between the panels of the door. Further, it is desirable to save time and money during assembly by attaching the door hardware to an intermediate panel.

SUMMARY OF THE INVENTION

The present invention overcomes the short comings of the prior art. The present invention provides a body panel assembly for dissipating impact energy. The body panel assembly includes an inner member having a desired inner area. The inner area is defined by a perimeter which includes a top, bottom, and sides. The assembly has an outer member with a desired outer area, defined by a perimeter which includes a top, bottom, and sides. The inner and outer members are positioned with respect to one another to define a cavity. An intermediate member is positioned in the cavity between the inner and outer members. The intermediate member extends from the top to the bottom of the inner and outer members. In addition, a structural material is positioned in a space between the outer member and the intermediate member for dissipating impact energy. The structural material extends from the top to the bottom of the intermediate and outer members and is comprised of foam or a honeycomb plastic.

BRIEF DESCRIPTION OF THE DRAWINGS

Additional advantages and features of the present invention will become apparent to those skilled in the art upon reading the following detailed description and upon reference to the drawings in which:

FIG. 2 is an exploded perspective view of the body panel assembly according to the present invention.

FIG. 2a is an exploded perspective view of a second embodiment of the present invention.

FIG. 4 is a cross-section view of the body panel assembly with the structural material comprised of a honeycomb plastic.

FIG. 5 is a cross-section view of the body panel assembly with the structural material comprised of foam.

FIG. 6 is a cross-section view of the connection of the bottom of the members of the body panel assembly where the intermediate member is welded to the inner member and the outer member is hem-flanged to the inner member.

FIG. 7 is a cross-section view of the connection of the bottom of the members of the body panel assembly where the intermediate member is fastened by a fastener, or welded, to the inner member and the outer member is hem-flanged to the intermediate member.

DETAILED DESCRIPTION OF THE PREFERRED EMBODIMENT

The following description of the preferred embodiment is merely exemplary in nature and is in no way intended to limit the invention or its application or its uses.

Figure 1:
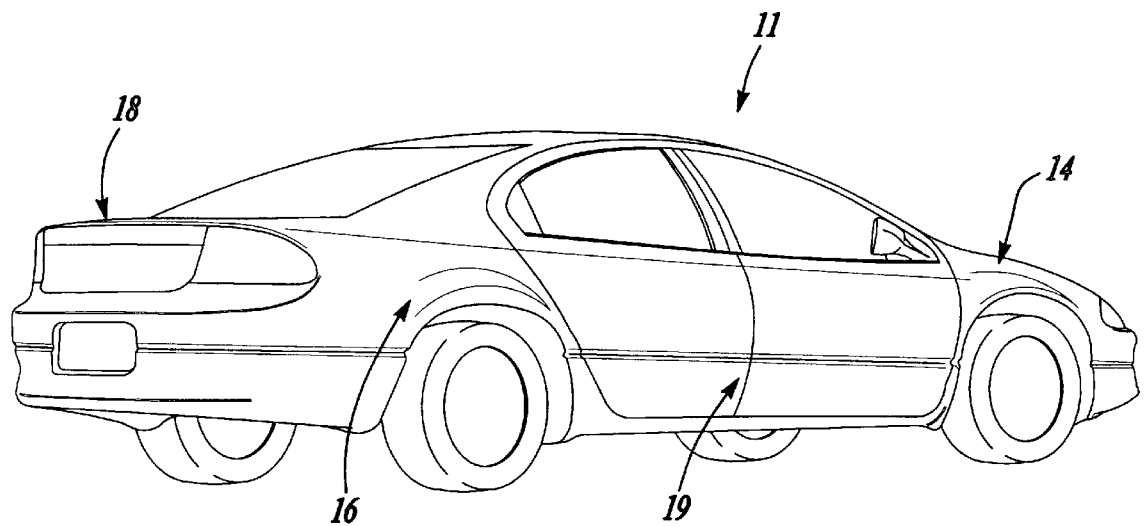
FIG. 1 illustrates a vehicle with the body panel assembly of the present invention.

Referring to FIG. 1, a vehicle 11 is illustrated with a front quarter 14, a rear quarter 16, and a tailgate 18. The front quarter 14 and the rear quarter 16 are separated by doors 19 for access to the interior of the vehicle 11. The doors 19 and the tailgate 18 are comprised of the body panel assembly 20 of the present invention.

FIG. 2 illustrates the body panel assembly 20 as applied to a vehicle door 19. The body panel assembly 20 includes an inner member 22, an outer member 24, and an intermediate member 26 positioned in the cavity 28 between the inner member 22 and the outer member 24. The inner member 22 includes various cutouts to receive and secure the door hardware. The hardware includes the window mechanism as well as speakers and the like. The inner member 22 has an inner area defined by a perimeter including a top 32, bottom 34, and sides 36. The outer member 24 likewise has an outer area defined by a perimeter including a top 38, a bottom 40, and sides 42. The inner member 22 and the outer member 24 are positioned with respect to each other such that the tops 32 and 38, bottoms 34 and 40, and sides 36 and 42 of the inner member 22 and the outer member 24 are aligned with respect to one another.

The body panel assembly 20 further includes end pieces 44. The end pieces 44 are defined by a perimeter including a top 46, bottom 48, and sides 50. The sides 50 of the end pieces 44 are coupled to the sides 36 and 42 of the inner member 22 and the outer member 24 defining the width of the cavity 28.

Also, the intermediate member 26 has an intermediate area defined by a perimeter which includes a top 52, bottom 54, and sides 56. The intermediate member extends in the cavity from the top 28 and 34 to the bottom 30 and 36 of the inner member 22 and the outer member 24.

Figure 3:
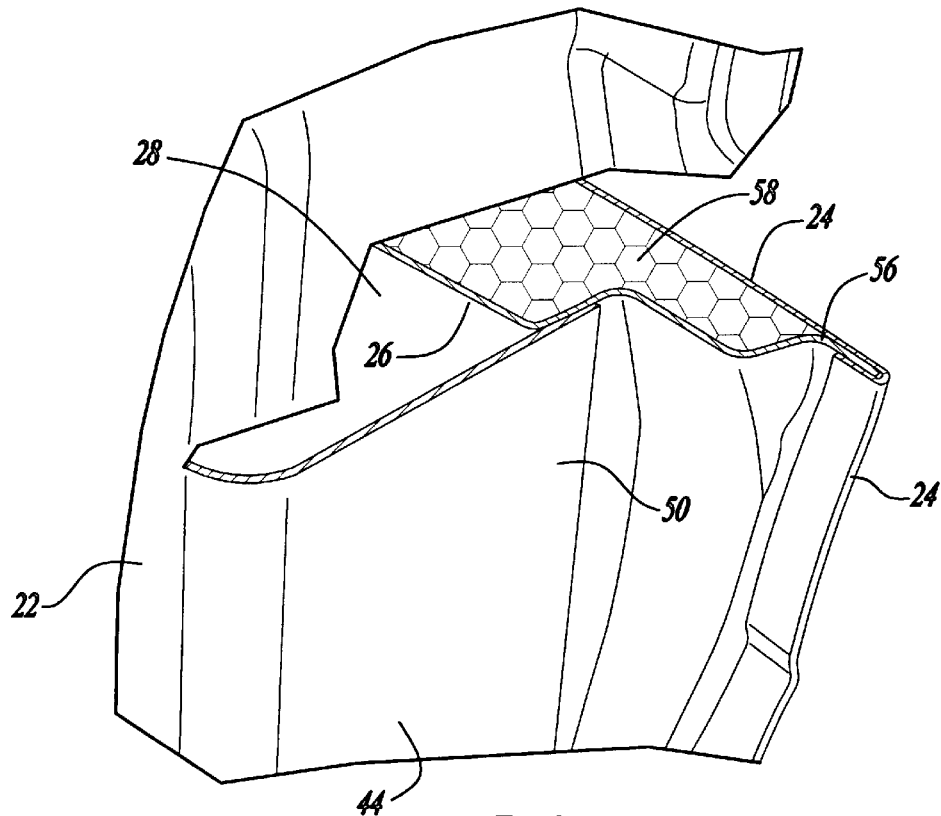
FIG. 3 is a perspective view partially in section view of the connection of the body panel assembly.

FIG. 3 is a cross sectional view of the body panel assembly 20. The cross section illustrates the inner member 22, the intermediate member 26, and the outer member 24 aligned with respect to one another. The members are spaced to allow a structural material 58, such as foam or, as shown, a honey comb plastic, to be positioned in the space between the outer member 24 and the intermediate member 26. In the preferred embodiment, the structural material 58 fills the entire space between the intermediate member 26 and the outer member 24 as shown in FIGS. 4 and 5. Thus, the structural material 58 extends top to bottom and side to side with respect to the outer member 24 and the intermediate member 26. The body panel assembly 20 is designed so the structural material 58 absorbs the impact energy during side impact. Since the structural material 58 dissipates the impact energy, impact beams are not required to absorb additional energy. Further, the body panel assembly 20 is lighter and more cost efficient with out the use of the impact beams inside the body panels.

As seen in FIG. 2a, a second embodiment of the invention, the door hardware 60 may be attached to the intermediate member 26 during the assembly process and occupy the space between the intermediate member 26 and the inner member 22 of the body panel assembly 20. The door hardware 60 does not extend through the intermediate member 26 and is accessed from only one side. This assembly process enables the door to be constructed efficiently with out any dislocation of the wiring or hardware.

FIG. 5 illustrates the body panel assembly 20 with the structural material 58 as foam 62. FIG. 4 illustrates the body panel assembly 20 with the structural material 46 as a honeycomb plastic 64.

The intermediate member 26 may include at least one horizontal rib 66 attached at both sides 56 of the intermediate member 26. The horizontal rib 66 is positioned on the intermediate member 26 to provide an area to secure the door hardware 60 to the intermediate member 26.

Figure 8:
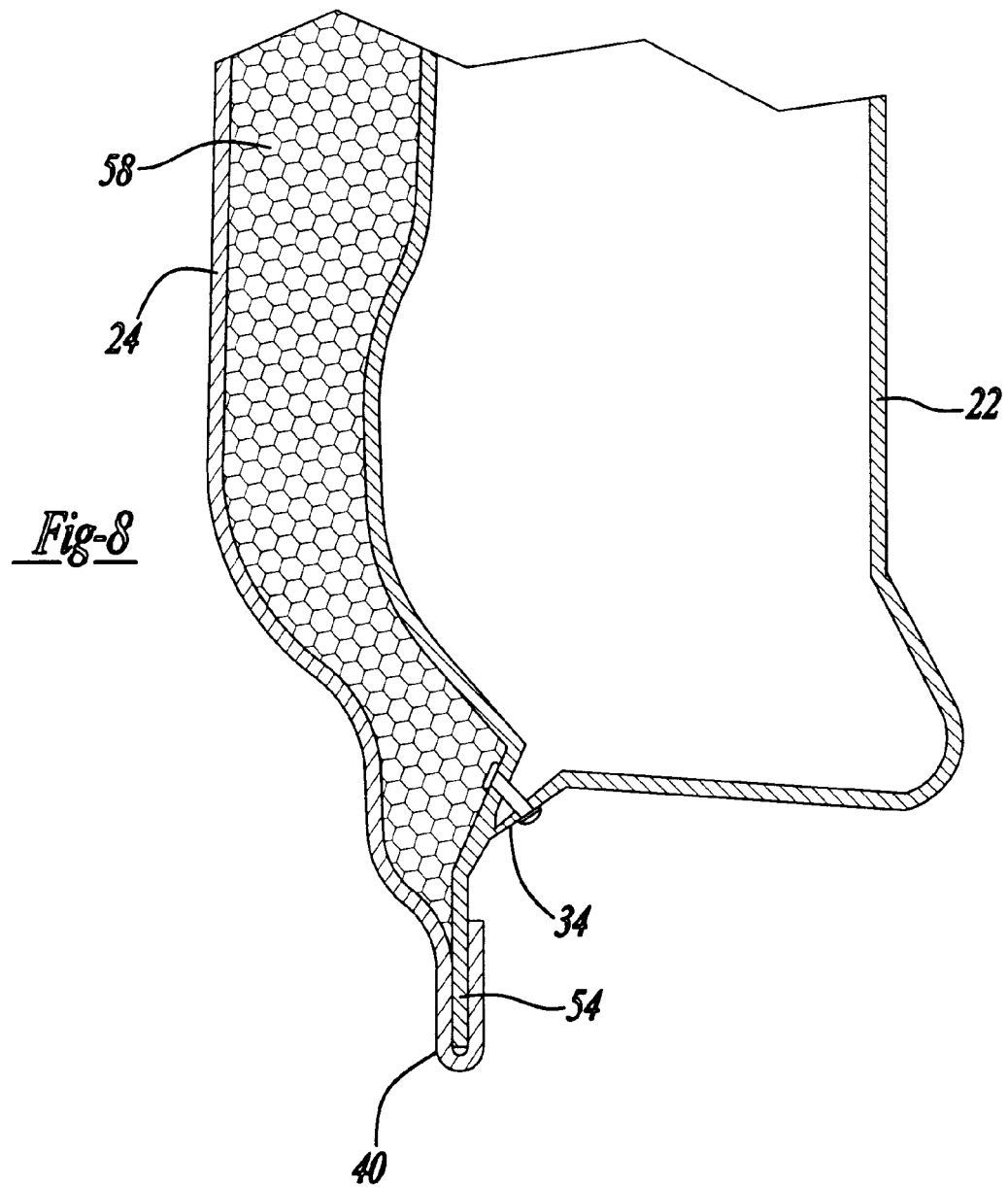
FIG. 8 is a cross-section view of the bottom of the members where a live hinge secures the inner panel to the intermediate panel.

FIGS. 6, 7 and 8 illustrate alternative connections for the inner member 22, the intermediate member 26 and the outer member 24 of the body panel assembly 20. FIG. 7 illustrates the inner member 22 welded or screwed to the intermediate member 26. The intermediate member 26 is hem-flanged to the outer member 24.

FIG. 6 illustrates the intermediate member 26 welded to the inner member 22. The outer member 24 is then hem-flanged around the inner member 22.

FIG. 8 shows the inner member 22 attached to the intermediate member by pop rivets or the like. Here, the inner member creates a live hinge enabling the inner member to be pulled away from the remainder of the door assembly.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. An energy absorbing body panel assembly of a vehicle, comprising:

an inner member having a desired inner area, the inner area defined by a perimeter including a top, a bottom, and sides;

an outer member having a desired outer area, the outer area defined by a perimeter including a top, a bottom, and sides, wherein the inner member and the outer member are positioned with respect to one another such that the tops, the bottoms, and the sides are aligned with one another;

an intermediate member positioned between said inner and outer members, said intermediate member extending from the top to the bottom and from side to side of said inner and outer members, said intermediate member has its top and bottom secured with said outer member top and bottom; said intermediate member defining an uninterrupted space extending from the top to the bottom and from side to side of said intermediate and outer members; and a structural material positioned in said space between said outer member and said intermediate member for dissipating impact energy wherein said structural material fills substantially the entire space between the intermediate and outer members.

2. An energy absorbing body panel assembly according to claim 1, wherein said intermediate member has a desired intermediate area, the intermediate area defined by a perimeter including a top, a bottom, and sides, said intermediate area configured to correspond to the inner and outer areas of the inner and outer members.

3. An energy absorbing body panel assembly according to claim 1, wherein said intermediate member includes at least one horizontal rib.

4. An energy absorbing body panel assembly according to claim 1, wherein said body panel assembly is a door.

5. An energy absorbing body panel assembly according to claim 1, wherein said structural material extends from the top to the bottom of the intermediate and outer members.

6. An energy absorbing body panel assembly according to claim 1, wherein said structural material is composed of foam.

7. An energy absorbing body panel assembly according to claim 1, wherein said structural material is composed of a honeycomb plastic.

8. An energy absorbing body panel assembly according to claim 1, wherein said intermediate member is welded to said inner or outer member.

9. An energy absorbing body panel assembly according to claim 1, wherein said intermediate member is hem-flanged to said inner or outer member.

10. A vehicle door comprising:

an inner member having a desired inner area, the inner area defined by a perimeter including a top, a bottom, and sides;

an outer member having a desired outer area, the outer area defined by a perimeter including a top, a bottom, and sides, wherein the inner member and the outer member are positioned with respect to one another such that the tops, the bottoms, and the sides are aligned with one another;

an intermediate member positioned between said inner and outer members, said intermediate member extending from the top to the bottom of said inner and outer members, said intermediate member has its top and bottom secured with said outer member top and bottom; said intermediate member defining an uninterrupted space extending from the top to the bottom and from side to side of said intermediate and outer members; and a structural material positioned in said space between said outer member and said intermediate member for dissipating impact energy wherein said structural material fills substantially the entire space between the intermediate and outer members.

11. A vehicle door according to claim 10, wherein said intermediate member has a desired intermediate area, the intermediate area defined by a perimeter including a top, a bottom, and sides, said intermediate area configured to correspond to the inner and outer areas of the inner and outer members.

12. A vehicle door according to claim 10, wherein said intermediate member includes at least one horizontal rib.

13. A vehicle door according to claim 10, wherein said structural material extends from the top to the bottom of the intermediate and outer members.

14. A vehicle door according to claim 10, wherein said structural material is composed of foam.

15. A vehicle door according to claim 10, wherein said structural material is composed of a honeycomb plastic.

16. A vehicle door according to claim 10, wherein said intermediate member is welded to said inner or outer member.

17. A vehicle door according to claim 10, wherein said intermediate member is hem-flanged to said inner or outer member.

18. A vehicle door having at least one body panel, said body panel comprising:

an inner member having a desired inner area, the inner area defined by a perimeter including a top, a bottom, and sides;

an outer member having a desired outer area, the outer area defined by a perimeter including a top, a bottom, and sides, wherein the inner member and the outer member are positioned with respect to one another such that the tops, the bottoms, and the sides are aligned with one another;

an intermediate member positioned between said inner and outer members, said intermediate member extending from the top to the bottom of said inner and outer members, said intermediate member has its top and bottom secured with said outer member top and bottom; said intermediate member defining an uninterrupted space extending from the top to the bottom and from side to side of said intermediate and outer members; and a structural material positioned in said space between said outer member and said intermediate member for dissipating impact energy.

* * * * *